United States Patent [19]

Scallan et al.

[11] Patent Number: 5,339,857

[45] Date of Patent: Aug. 23, 1994

[54] MEDIA ASSISTED VALVES

[75] Inventors: David J. Scallan, Pineville; George W. Parker, Dry Prong, both of La.

[73] Assignee: Dresser Industries Inc., Dallas, Tex.

[21] Appl. No.: 972,616

[22] Filed: Nov. 6, 1992

[51] Int. Cl.⁵ .......................................... F16K 31/383
[52] U.S. Cl. ...................................... 251/38; 251/44
[58] Field of Search ............................ 251/30.04, 38, 44

[56] References Cited

U.S. PATENT DOCUMENTS

| | | | |
|---|---|---|---|
| 1,194,965 | 8/1916 | Darrow | 251/38 |
| 1,217,792 | 2/1917 | McConnell et al. | 251/38 |
| 1,248,777 | 12/1917 | Ahlheim | 251/38 |
| 1,254,869 | 1/1918 | Watrous | 251/38 X |
| 2,805,039 | 9/1957 | Angelery | 251/38 |
| 3,033,228 | 5/1962 | Mohler | 137/490 |
| 3,570,805 | 3/1971 | Moran et al. | 251/38 |
| 3,667,722 | 6/1972 | Katz et al. | 251/38 X |
| 4,526,340 | 7/1985 | Kolchinsky et al. | 251/38 |
| 4,653,721 | 3/1987 | Bachmann et al. | 251/88 |

*Primary Examiner*—Gerald A. Michalsky
*Attorney, Agent, or Firm*—Johnson & Gibbs

[57] ABSTRACT

A media assisted flow control valve having a main body provided with an inlet, and outlet, a chamber defining a flow passage connecting the inlet and the outlet, and a main valve seat around the flow passage, a main valve mounted in the chamber and having a seat surface engageable with the main valve seat to open and close the valve, the main valve having a flow passage therethrough and a pilot valve seat formed around the main valve flow passage, a pilot valve mounted for movement in the main valve, the pilot valve having a seat surface engageable with the pilot valve seat in the main valve to open and close the pilot valve, a pilot valve stem connected at one end with the pilot valve and extending at the other end exterior of the valve body, and a spring mounted on the pilot valve stem exterior of the valve body to bias the pilot valve and main valve closed. The main valve has a first surface portion upstream of the main valve seat exposed to media pressure for opening the main valve when the pilot valve is open. The main valve fits in a flow restriction relation in the valve body and has a second surface portion downstream of the flow restriction over which media pressure is reduced when the pilot valve is open permitting media pressure on the first portion of the main valve to open the main valve.

9 Claims, 3 Drawing Sheets

MEDIA ASSISTED VALVES

This invention relates to valves and more particularly relates to a flow control valve assisted in operation by the fluid media being controlled.

BACKGROUND OF THE INVENTION

Media assisted valves are well known for controlling fluid flow under a variety of conditions and for a variety of purposes. For example, such a valve may be used as a pressure relief or safety valve. Available valves of the type of the invention often have a substantial number of parts which generally increases the cost of manufacture and assembly of the valve. Further, such valves frequently include internal operating parts which are more difficult and time consuming than the present invention to change for valve repair and are affected by temperature changes in the media being controlled, often precluding high temperature service. Some such valves utilize operating parts which include valve members not under positive control at all times during operation in both directions. The absence of structure for positive control in both directions may cause a valve to chatter.

SUMMARY OF THE INVENTION

It is a principal object of the invention to provide a new and improved media assisted valve.

It is another object of the invention to provide a media assisted valve having a minimum of operating parts.

It is another object of the invention to provide a media assisted valve which removes certain operating parts from the environment of the flowing media to minimize any effect the temperature of the media might have on valve operation.

In accordance with the invention, there is provided a media assisted valve which includes a valve body provided with an inlet, an outlet, a chamber defining a flow passage connecting the inlet and outlet, a main valve seat in the body around the flow passage between the inlet and outlet, a main valve movable in the flow passage relative to the main valve seat to control flow between the inlet and outlet, a pilot valve seat around an opening in the main valve, and a pilot valve mounted in the main valve for movement relative to the pilot valve seat. A pilot valve stem is secured into the pilot valve extending externally of the valve housing, and a spring is mounted on the stem external of the housing biasing the stem in a pilot and main valve closing direction. To operate the valve, the pilot valve stem is depressed against the spring moving the pilot valve away from the pilot valve seat in the main valve permitting flow around and through the main valve producing a pressure differential across the main valve which moves the main valve away from the main valve seat in the housing permitting flow from the inlet to the outlet bypassing the pilot valve and the main valve. Release of the force on the valve stem permits the spring to expand moving the pilot valve and main valve in a closing direction with the pilot valve seated on the pilot valve seat in the main valve and the main valve seated on the main valve seat in the housing closing off flow through the valve.

BRIEF DESCRIPTION OF THE DRAWINGS

The details of specific embodiments of the invention and the foregoing objects and advantages will be better understood from the following description taken in conjunction with the accompanying drawings wherein.

DETAILED DESCRIPTION OF THE PREFERRED EMBODIMENT

Figure 1:
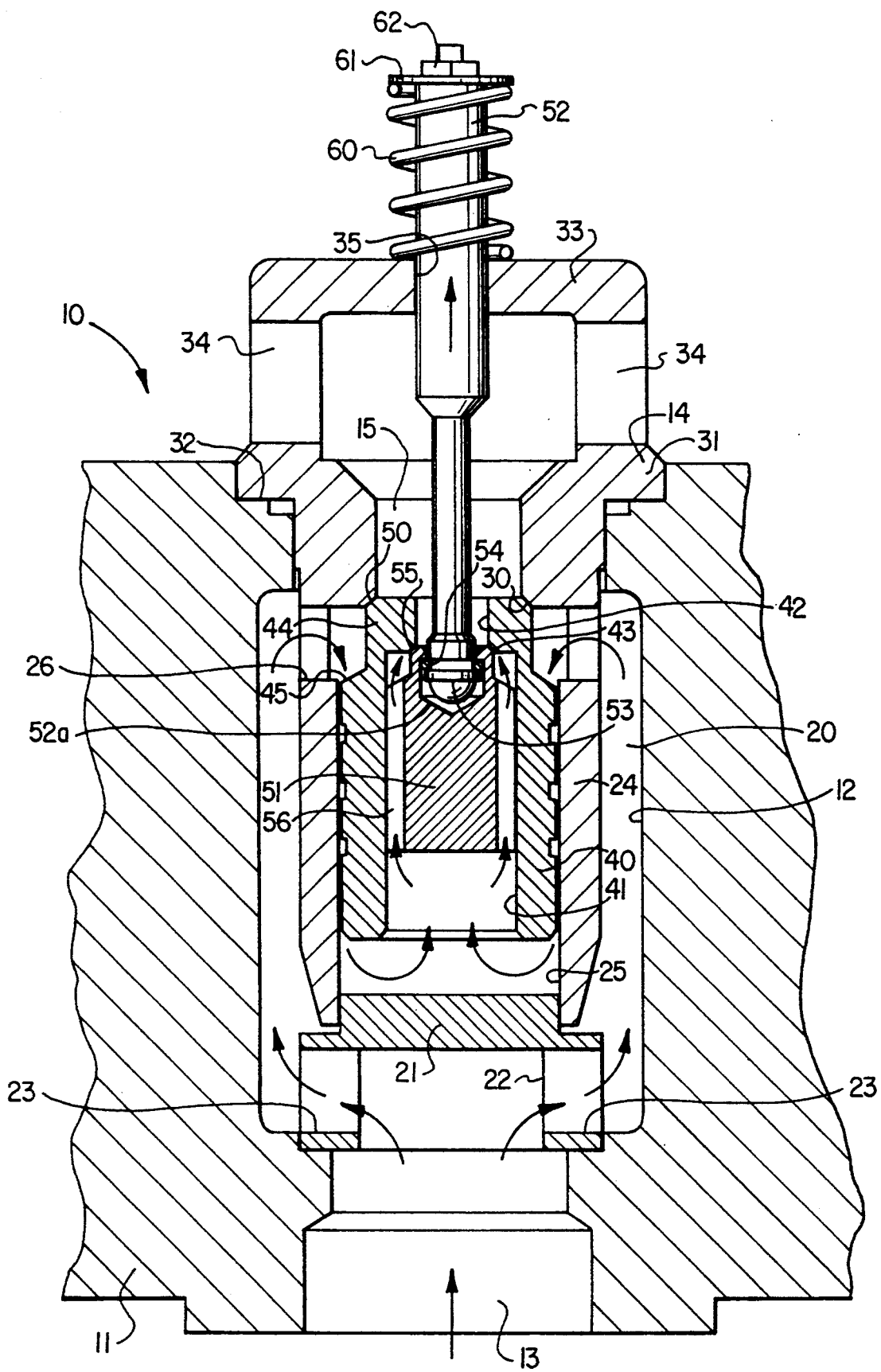
FIG. 1 is a fragmentary longitudinal view in section and elevation showing the valve of the invention closed.

Referring to FIG. 1, a valve 10 embodying the features of the invention includes a main valve body 11 provided with a valve chamber 12 having a flow inlet 13. A tubular inner body 14 is mounted in the body 11 extending into the chamber 12 spaced within the chamber defining a central flow passage 15 within the inner body and an annular flow passage 20 around the inner body. A lower end portion of the inner body telescopes onto a flow fitting 21 mounted in the bottom of the chamber 12. The fitting 21 has a downwardly opening bore 22 communicating with the inlet 13 and circumferentially spaced ports 23 for media flow from the bore 22 through the fitting into the annular flow passage 20 around the inner body. A tubular portion 24 of the inner body in the chamber 12 forms a main valve guide having a uniform cylindrical bore 25 which opens to the inner body central flow passage 15 through an annular main valve seat 30. The inner body has an external annular flange 31 which engages an internal annular seat surface 32 in the main body supporting the inner body in the main body. The flow passage 15 of the inner body is enlarged within a head 33 of the inner body extending above the outer body and provided with outlet ports 34. A bore 35 is formed in the head 33 of the inner body along an axis coincident with the axis of the flow passage 15 in the inner body.

Figure 2:
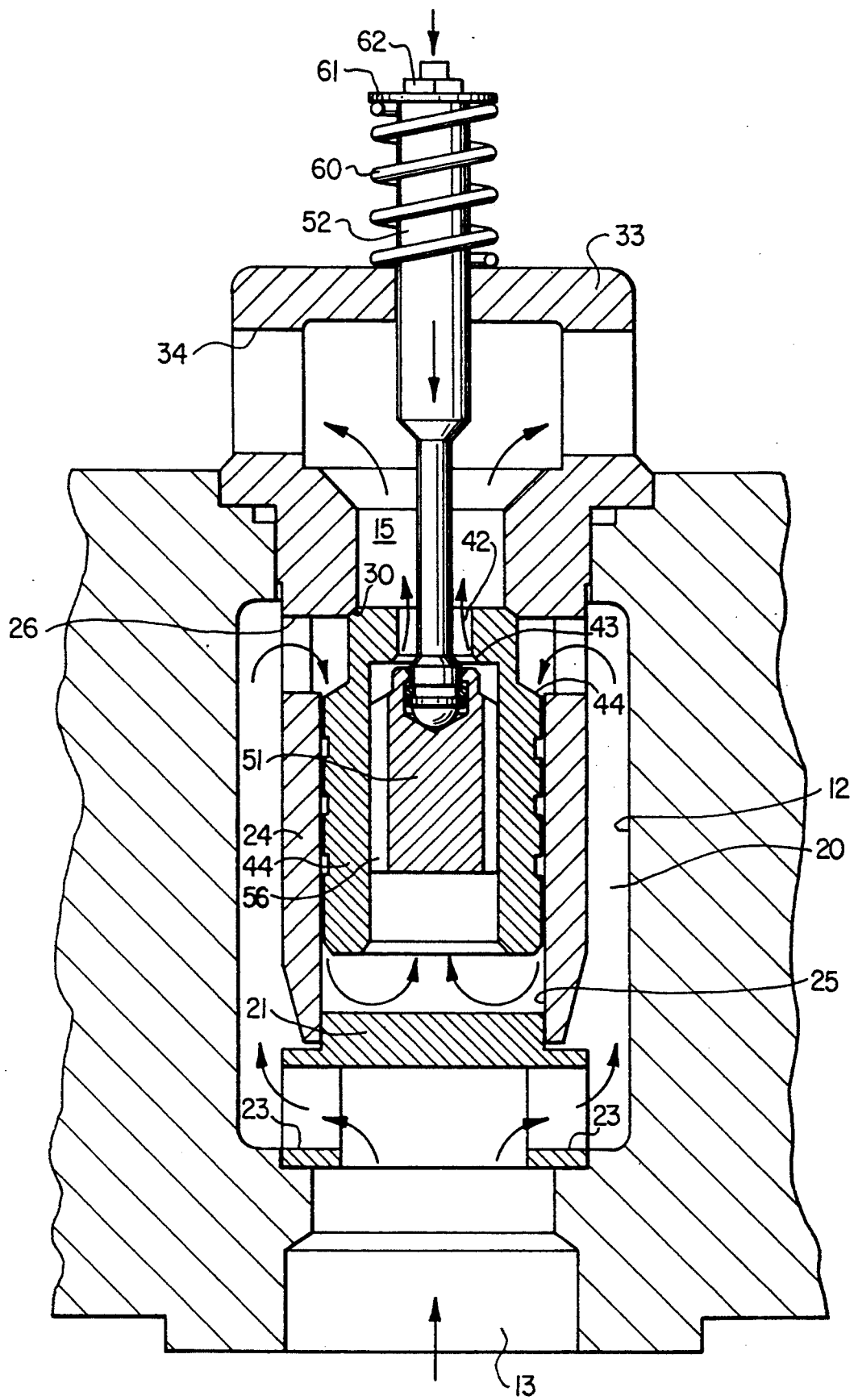
FIG. 2 is a fragmentary view in section and elevation similar to FIG. 1, showing the first stage in the operation of the valve at which the inner pilot valve is moved off the pilot valve seat in the main valve.
Figure 3:
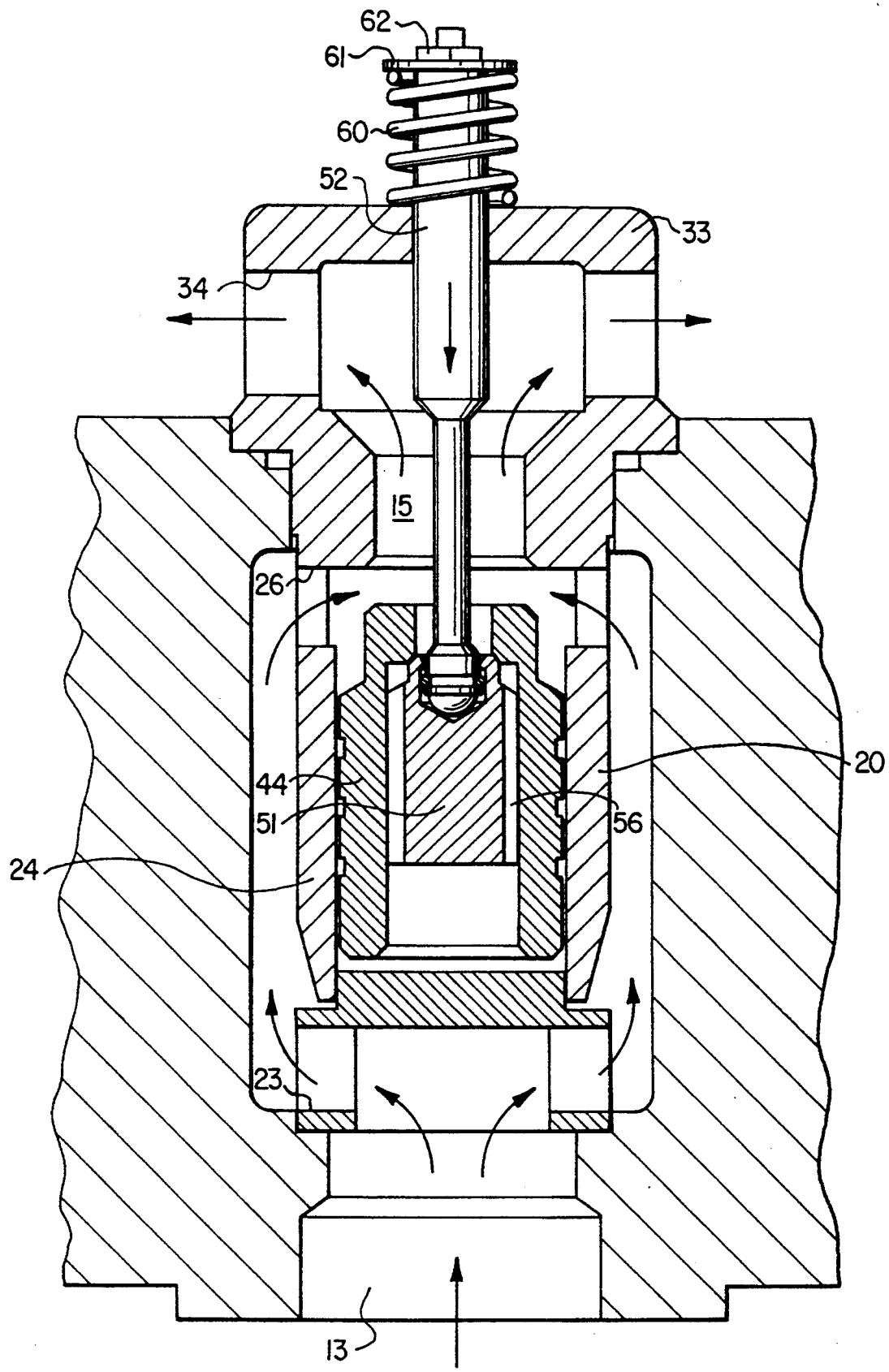
FIG. 3 is a fragmentary view in section and elevation similar to FIGS. 1 and 2, showing the valve fully open.

A tubular shaped main valve 40 is slidably mounted in the inner body bore 25 for movement between the closed position of FIG. 1 and the open position of FIG. 3. The main valve has a central bore 41 opening through the lower end of the main valve and extending to a reduced bore 42 through a tapered annular pilot valve seat 43. The bores 41 and 42 provide a central, pilot-valve, flow passage through the main valve. The external diameter of the main valve 40 is sufficiently smaller than the inner body bore 25 to restrict flow communication along the main valve in the inner body along the bore 25, as represented in FIGS. 1 and 2 by the flow arrow designations. The main valve is reduced in diameter along a head portion 44 providing a sloping external annular surface 45 on the main valve forming a first pressure responsive main valve surface portion facing media flow into the inner body through the ports 26 into the inner body bore 25 upstream of the seat 30. The head end of the main valve 40 is provided with an external annular tapered seat surface 50 engageable with the valve seat surface 30 in the inner body to shut off flow around the main valve into the central flow passage 15 above the main valve.

A cylindrical pilot valve 51 is mounted within the bore 41 of the main valve on a pilot valve stem 52 slidably disposed through the bore 35 in the head 33 of the inner body. The pilot valve has an upwardly opening socket 52a which receives an enlarged lower end portion 53 on the pilot valve stem. A lock ring 54 in an external annular recess on the lower end of the valve stem releasably locks the pilot valve on the valve stem. An external annular tapered seat surface 55 is formed on the upper end of the pilot valve to engage the main valve seat surface 42 to shut off flow around the pilot valve through the main valve. The pilot valve has external, longitudinal, circumferentially spaced flow slots 56 for flow along the pilot valve in the main valve bore 45. A spring 60 on the valve stem is compressed between the head end of the inner body 33 and a retainer washer 61 secured on the stem by a nut 62. The characteristics and the compression of the spring are determined by the requirements for opening the pilot valve and closing the pilot valve and the main valve under the normal operating pressures of the media controlled by the valve. The pilot valve is positively secured on the valve stem so that the pilot valve is moved upwardly and downwardly by the valve stem.

The valve 10 of the invention operates to control flow from the valve inlet 13 to the valve outlet ports 34 responsive to operation of the pilot valve stem 52. FIG. 1 illustrates the valve 10 in a closed state at which both the pilot valve 51 and the main valve 40 are closed preventing media flow between the inlet 13 in the main body 11 and the outlet ports 34 in the inner body head 33. When the valve is closed, the main valve seat surface 50 engages the inner body seat 30 preventing flow around the main valve into the central flow passage 15 above the main valve. The pilot valve seat surface 55 engages the pilot valve seat 43 in the main valve preventing flow from the main valve bore 41 around the pilot valve into the reduced upper bore 42 of the main valve. With the valve closed, no media flow may occur from the valve inlet 13 to the central bore 15 around either the main valve 40 or the pilot valve 51, and upstream media pressure is applied to both the main valve and the pilot valve from the media communicated into the outer valve housing 11 through the inlet 13. The pressure acts through the bore 22 into the ports 23 and through the annular passage 20 around the inner body to the inner body ports 26. The pressure of the media through the ports 26 is applied to the upper annular surface 45 on the main valve, downwardly around the main valve within the bore 25, around the lower end of the main valve, and upwardly through the main valve bore 41 in the slots 56 along the pilot valve 51. The pressure in the main valve around the pilot valve cannot, however, be communicated farther upwardly into the main valve bore 42 because the pilot valve is seated against the pilot valve seat 43 in the main valve. With the valve 10 closed and no flow occurring, static conditions exist, and thus, equal pressure will exist in the various flow passages of the valve around both the main valve and the pilot valve upstream of the seats of the valves. The downwardly facing areas on both the main valve and the pilot valve below the seats exceed the upwardly facing area of the surface 45 on the main valve, and thus, the media pressure biases the main valve and the pilot valve upwardly to closed positions. Additionally, the force of the compressed spring 60 on the valve stems 52 biases the valve stem and the pilot valve closed.

To open the valve 10, a downward force is applied to the valve stem 52 as graphically represented in FIG. 2. The downward force on the pilot valve stem compresses the spring 60 moving the lower end of the stem downwardly in the pilot valve pressing the pilot valve downwardly to the open position of FIG. 2. The seat surface 55 on the pilot valve is moved away from the seat surface 43 in the main valve to permit communication around the pilot valve within the main valve into the bore 42 of the main valve above the pilot valve. With the pilot valve 51 open, flow is permitted within the bore 41 of the main valve 40 upwardly past the pilot valve in the slots 56, between the seat surface 55 on the pilot valve and the seat surface 43 in the main valve reducing the pressure below the pilot valve and the main valve within the bore 25 of the inner body 24. The pressure drop along the restriction between the outer surface of the main valve and the bore surface 25 of the inner body results in a higher relative pressure above the main valve on the surface 45 of the main valve pushing the main valve downwardly from the closed position of FIG. 2 to the open position of FIG. 3. The downward movement of the main valve is stopped by the engagement of the pilot valve seat surface 43 in the main valve with the seat surface 55 on the pilot valve, as illustrated in FIG. 3. The fluid media now flows directly through the inner body ports 26, upwardly and inwardly around the upper portion of the main valve into the central flow passage 15, upwardly around the stem 52, and outwardly through the ports 34. Thus, the opening of the main valve permits flow from the inlet 13 through the ports 23, upwardly around the inner body 24 in the annular flow passage 20, and inwardly through the ports 26 to the central flow passage 15 from which the flowing media exits from the valve 10 through the ports 34. Responsive to the opening of the pilot valve 51, the main valve has been opened by the flowing media controlled by the valve 10. Thus, the flowing media has assisted in opening the main valve.

The valve 10 is closed by removing the downward force on the stem 52 permitting the spring 60 to expand lifting the stem pulling the pilot valve upwardly along with the main valve which is hanging on the pilot valve as shown in FIG. 3. The pilot and main valves are returned to the closed positions of FIG. 1 shutting off flow through the valve 10 between the inlet 13 and the outlet ports 34. Fluid media flows along the restriction between the main valve and the inner body building up the pressure below the main and pilot valves providing further force holding the valve closed.

It will be seen that a new and improved valve has been described and illustrated which utilizes forces applied by the flowing media being controlled by the valve. It will also be seen that a minimum of parts comprise the valve, and the actuating spring which closes the valve is not subject to temperature changes in the media flowing through the valve.

What is claimed is:

1. A media assisted flow control valve comprising:
   a main valve body having a flow inlet, a flow outlet, a chamber defining a flow passage connecting the inlet and outlet, and a main valve seat around the flow passage between the inlet and outlet;
   a main valve member slidably mounted in the chamber for movement relative to the main valve seat to engage and disengage from the main valve seat to open and close the valve, a portion of the main valve member extending radially outwardly beyond the main valve seat upstream of the main valve seat to provide a first portion of the main valve member exposed to media pressure in the flow passage upstream of the main valve seat to apply a valve opening force to the main valve away from the main valve seat, a second portion of the main valve being in restricted communication with the flow passage upstream of the main valve seat to apply a valve closing force to the main valve, the main valve having an opening defined by a pilot valve seat into the flow passage downstream of the main valve;

an inner valve body mounted in the chamber of the main valve body forming a valve guide around the main valve member, the inner valve body being spaced in the chamber dividing the chamber into an annular flow passage portion and a central flow passage portion, the annular portion extending from the flow inlet to port means formed in the inner body opening to apply media pressure to the first portion of the main valve member upstream of the main valve seat, the main valve member being spaced in the inner body to provide the restrictive communication to the second portion of the main valve member, the main valve seat being formed in the inner body, and the central portion of the flow passage downstream of the main valve seat opening into the flow outlet;

a pilot valve member disposed in the central flow passage upstream of the pilot valve seat in the main valve member and engageable with and disengageable from the pilot valve seat to open and close the pilot valve;

a pilot valve stem secured at a first end into the pilot valve to positively move the pilot valve relative to the pilot valve seat for opening and closing the pilot valve, a second end of the pilot valve stem extending exterior of the main valve body; and a spring on the pilot valve stem external of the valve body and compressed to urge the stem in a direction to engage the pilot valve with the pilot valve seat in the main valve member to close the pilot valve, the spring being further compressible to disengage the pilot valve from the pilot valve seat to open the pilot valve reducing the media pressure upstream of the pilot valve seat on the second portion of the main valve member whereby media pressure on the first portion of the main valve member opens the main valve member.

2. A media assisted flow control valve according to claim 1 wherein the inner body and the main valve are tubular members, the pilot valve is a cylindrical member having longitudinal external flow slots, and the longitudinal axes of the valve stem and the pilot valve are coincident.

3. A media assisted valve according to claim 2 where the port means in the inner body is upstream of the main valve seat and the first portion of the main valve.

4. A media assisted valve according to claim 3 where the inner body has a closed inward end and the flow inlet opens into the upstream end of the annular portion of the flow passage.

5. A media assisted valve according to claim 4 where the main valve is a graduated tubular member having a first reduced portion provided with an annular seat surface engageable with the main valve seat, the first reduced portion is exposed to media pressure upstream of the main valve seat to open the main valve, and main valve has a second larger portion fitting in spaced slidable relation in the inner body to provide the restricted communication along the main valve to the second pressure responsive portion of the main valve.

6. A media assisted valve according to claim 5 including a flow inlet fitting connected into the inward end of the inner body and having port means connecting the flow inlet and the upstream end of the annular portion of the flow passage.

7. A media assisted valve according to claim 6 wherein the pilot valve has a coupling socket opening through the pilot valve seat surface and a lock ring is fitted on the pilot valve stem positively connecting the pilot valve stem into the pilot valve.

8. A media assisted valve according to claim 7 wherein the spring is mounted on the pilot valve stem between an outer end of the head of the inner valve body and a stop washer on the stem outer end portion.

9. A media assisted valve according to claim 8 where the main valve seat is larger than and downstream of the pilot valve seat.

* * * * *

UNITED STATES PATENT AND TRADEMARK OFFICE
CERTIFICATE OF CORRECTION

PATENT NO. : 5,339,857
DATED : August 23, 1994
INVENTOR(S) : David J. Scallan and George W. Parker It is certified that error appears in the above-indentified patent and that said Letters Patent is hereby corrected as shown below:

Column 3, line 41: Delete "pass age"; insert --passage--

Signed and Sealed this

Seventeenth Day of January, 1995

Attest:

BRUCE LEHMAN

*Attesting Officer*  *Commissioner of Patents and Trademarks*